June 18, 1963 J. H. SHEPLEY 3,094,063
BALER FEED MECHANISM
Filed June 29, 1961 3 Sheets-Sheet 1

INVENTOR
JOHN H. SHEPLEY
BY Joseph A. Brown
ATTORNEY

June 18, 1963 J. H. SHEPLEY 3,094,063
BALER FEED MECHANISM
Filed June 29, 1961 3 Sheets-Sheet 2
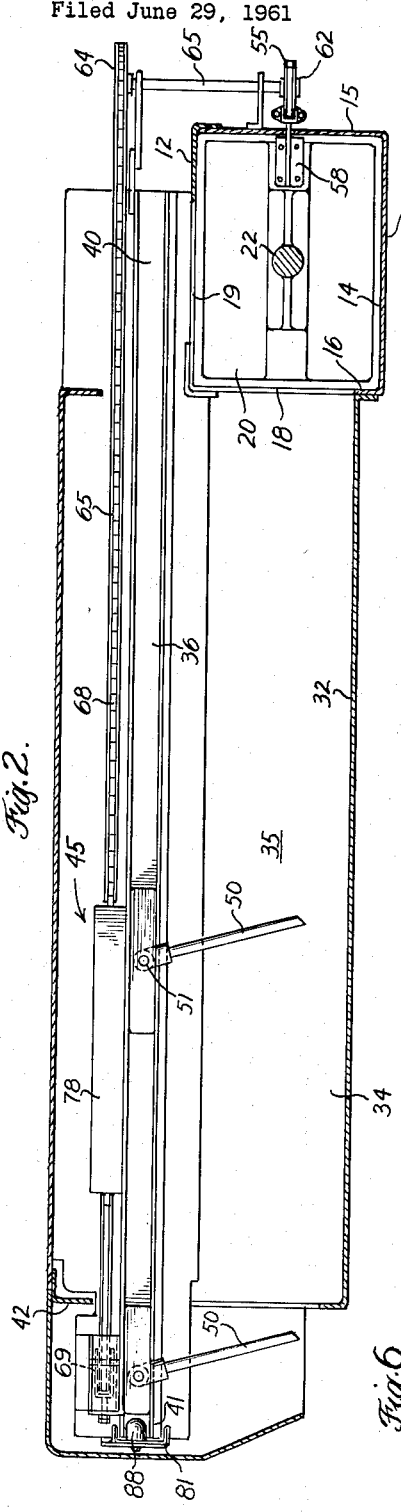
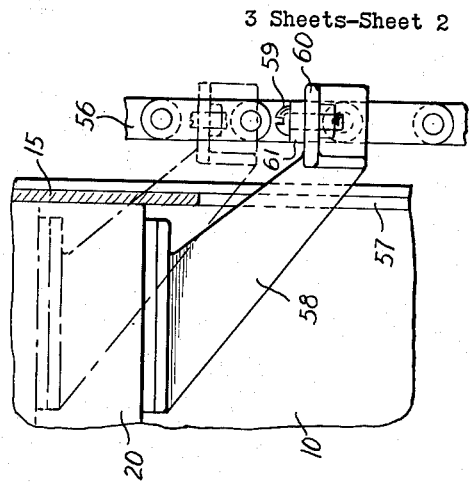
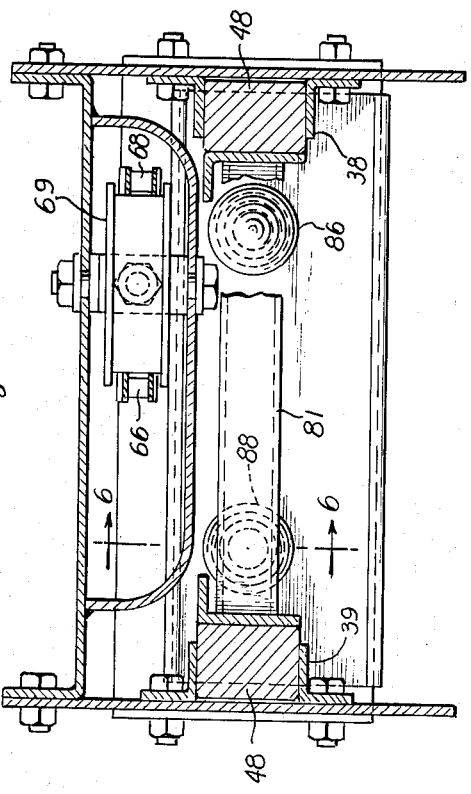
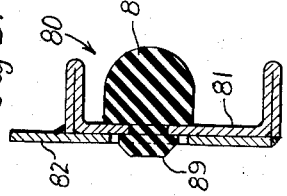
INVENTOR
JOHN H. SHEPLEY
BY
ATTORNEY

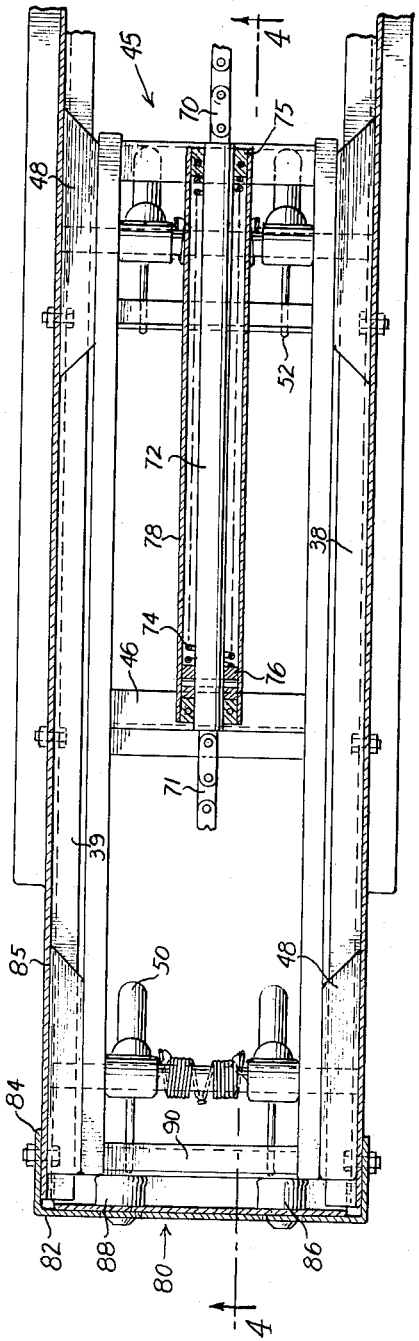
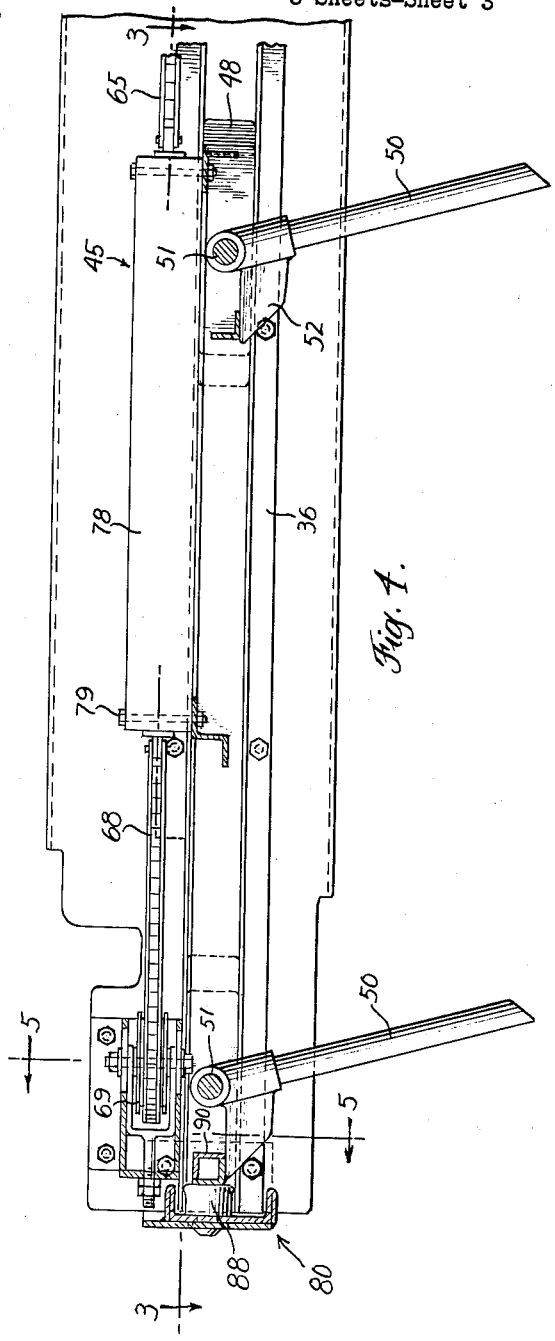

United States Patent Office 3,094,063
Patented June 18, 1963

3,094,063
BALER FEED MECHANISM
John H. Shepley, Lancaster, Pa., assignor to Sperry Rand Corporation, New Holland, Pa., a corporation of Delaware
Filed June 29, 1961, Ser. No. 120,695
2 Claims. (Cl. 100—142)

This invention relates generally to hay baler feed mechanisms and more particularly to an improvement in the reciprocable feed mechanism shown in U.S. patent application Serial No. 36,561, filed June 16, 1960 and assigned to the assignee of this application.

In the mechanism shown in the mentioned patent application, and in similar baler feeder mechanisms, there is a fore-and-aft extending bale case having a feed opening in a vertical side wall. A bale forming plunger reciprocates in the bale case, and extending laterally of the bale case is a platform which communicates with the feed opening. Mounted on a track above the platform is a feed mechanism comprising a carriage which is adapted to be reciprocated toward and away from the bale case in timed relation with the reciprocations of the plunger. The carriage is reciprocated by means of a chain which is oscillated by a connection to the plunger. The feed fingers of the feed mechanism extend in an erect manner during a feeding stroke and lay back on a return stroke.

The connection between the baler plunger and the feeder drive chain includes a shear bolt which is adapted to break if the feed mechanism becomes overloaded on a feeding stroke. This stops the feeder carriage, and on the next return stroke the drive is operative to return the feeder carriage towards retracted position. The breakage of the shear bolt on an infeed stroke allows the carriage to overrun on the next retracting stroke. Since the carriage reciprocates at high speed, such as 70 strokes a minute, it has substantial inertia when it reaches a retracted position. On overrunning, the carriage comes into engagement with baler frame structure around the outer end of the feeder track and the engaging parts are subjected to substantial shock loads. Damage often results.

One object of this invention is to provide, in a feeder mechanism of the character described, resilient means for cushioning and then stopping overrunning of a feeder carriage on a return stroke after the drive to the carriage from a plunger has been disconnected on a prior feeding stroke.

Another object of this invention is to provide, in a feeder mechanism of the character described, resilient means so located relative to the feeder carriage that shock loads which are developed in the resilient means and the carriage are equally distributed throughout the carriage structure and the feeder framework thereby minimizing wear and tear.

Another object of this invention is to provide, in a feeder mechanism of the character described, resilient means which is of such nature that when it is engaged by the feeder carriage, energy is absorbed and spring-back of the carriage is reduced.

A further object of this invention is to accomplish the aforementioned objects with a structure which is inexpensive to manufacture and assemble.

Other objects of this invention will be apparent hereinafter from the specification and from the recital in the appended claims.

In the drawings:

FIG. 2 is a section taken generally on the line 2—2 of FIG. 1 looking in the direction of the arrows;

FIG. 3 is an enlarged fragmentary plan view of one end of the feeder track, certain of the parts of the feeder carriage being shown in section, this view being taken generally on the line 3—3 of FIG. 4 looking in the direction of the arrows;

FIG. 4 is a section taken on the line 4—4 of FIG. 3 looking in the direction of the arrows;

FIG. 5 is an enlarged section taken on the line 4—4 of FIG. 3 looking in the direction of the arrows and showing the relationship of the resilient stop means with the feeder carriage;

FIG. 6 is a section taken on the line 6—6 of FIG. 5 looking in the direction of the arrows; and FIG. 7 is an enlarged fragmentary view showing the connection of the baler plunger with the drive therefrom to the feeder carriage and illustrating the shear bolt means employed in the drive.

Figure 1:
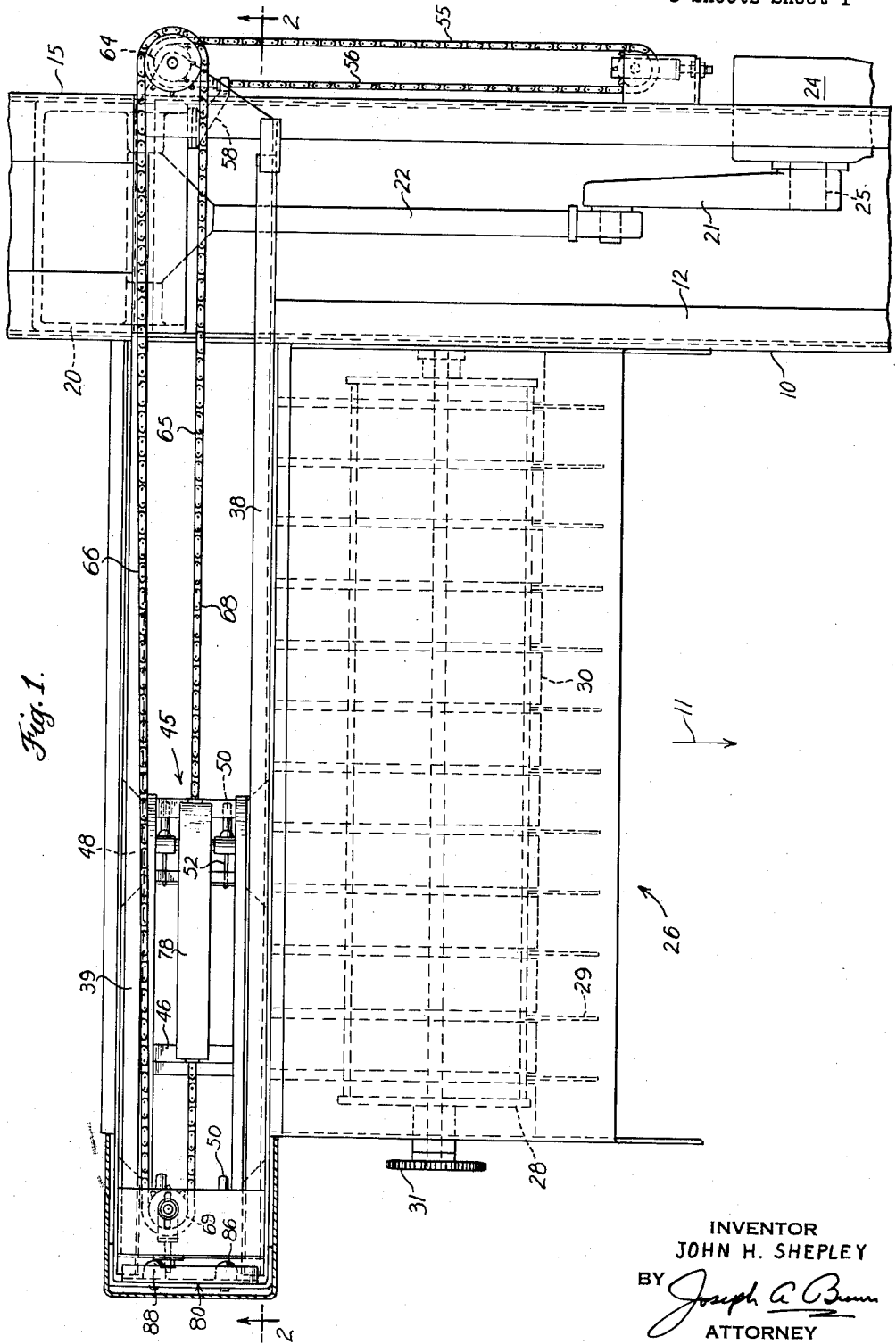
FIG. 1 is a fragmentary plan view of a hay baler having a feeder mechanism reciprocable on a horizontal track and having associated therewith resilient stop means constructed according to this invention.

Referring now to the drawings by numerals of reference, 10 denotes a hay baler bale case which is rectangular in cross section and extends in a fore-an-d-aft direction relative to the direction of travel of the baler indicated by the arrow 11 in FIG. 1. The bale case has a top wall 12, a bottom wall 14, an outside wall 15 and an inside wall 16. Inside wall 16 is provided with a feed opening 18 through which crop material may be fed into the bale case. The top wall 12 is slotted at 19, such slot communicating with the opening 18.

Reciprocable in bale case 10 is a bale forming plunger 20 driven by a rotatable crank arm 21 connected to the plunger by means of a connecting rod 22. Crank arm 21 receives power from a gearbox 24 provided with an output shaft 25 to which the crank arm is keyed. The gearbox receives power from the tractor or other vehicle used in towing the baler or from some other source. In its reciprocable movements, plunger 20 moves rearwardly on a working stroke and past opening 18. After each working stroke, it retracts to a position forwardly of the opening. Hay delivered to bale case 10 is compressed by the plunger into bales and each bale is moved progressively rearwardly as it is formed. After completion, each bale is banded by a tying mechanism, not shown, and subsequently discharged rearwardly onto the ground or to a trailing wagon.

Positioned alongside inside wall 16 of bale case 10 and forwardly of the opening 18, is a transversely extending rotatable pick-up mechanism 26 comprising a reel 28 having angularly spaced rows of radially projecting pick-up fingers 29. The fingers in each row are laterally spaced relative to each other and separated by stripper plates 30. The pick-up is rotated by drive means which includes a drive sprocket 31. Crop material resting on the ground in a windrow is adapted to be engaged by the fingers 29 and elevated. The material is lifted upwardly and discharged rearwardly over stripper plates 30 and deposited on a hay receiving platform 32. As shown in FIG. 2, platform 32 extends horizontally from adjacent the lower end of the opening 18. Rearwardly of the platform is a vertical wall 34. Platform 32 and rear wall 34 provide two walls of a feed chamber 35 for reception of material delivered by the pick-up.

Bale case 10, pick-up 26 and feed platform 32, as well as other baler structure, are carried on a conventional mobile baler frame, not shown.

For feeding crop material across the platform 32 through the opening 18 and into the bale case 10 between successive compression strokes of the plunger 20, a feeder mechanism is provided which comprises a track 36 having a pair of spaced track members 38 and 39. Track 36 extends transverse to the direction of reciprocation of plunger 20, having one end 40 positioned above the bale case 10 and an opposite or remote end 41 spaced from the bale chamber end and supported on side wall structure 42 of the baler. The track 36 forms a slotted roof above feed chamber 35.

Mounted on track 36 is a carriage 45 which is reciprocable toward and away from the bale chamber. The carriage comprises a framework 46 which is generally rectangular when viewed in plan, FIGS. 1 and 3. The carriage has four support bearings or blocks 48, one at each corner of the framework. These support bearings are preferably made of a hard wood for sliding engagement with the track members 38 and 39 of the track 36.

Depending from carriage 45 are feed fingers 50 which are pivoted at their upper ends 51 to the carriage and provided with stop tabs 52 engageable with the carriage framework. When viewed as shown in FIG. 4, the fingers 50 are free to pivot in a counterclockwise direction. However, pivoting in a clockwise direction is limited by the engagement of the tabs 52 with the carriage. Thus, the fingers assume an erect position on a feeding stroke of the carriage toward the bale case 10 and pivot back on a return stroke thereof.

To reciprocate carriage 45 toward and away from the bale case 10 in timed relation with the reciprocations of the plunger 20, drive means is provided comprising a chain 55 (FIG. 1) which extends in a fore-and-aft direction alongside the outside wall 15 of the bale case 10. Chain 55 has a reach 56 connected to the plunger 20 as shown best in FIG. 7. A bracket 58 is provided on the plunger which projects through slot 57 in bale case side wall 15 and which is linked to the chain by a shear bolt 59. The bolt extends through a tab 60 on bracket 58 and member 61 on chain 55. It is adapted to break when overloaded. The connection is such that the shear bolt is adapted to break on a retracting stroke of the plunger to disconnect the plunger from the chain 56. However, on the next working stroke of the plunger, the tab 60 engages member 61 and links up again with the chain to drive it.

When shear bolt 59 is in place, and plunger 20 is reciprocated, endless chain 55 is oscillated. Such oscillation is transmitted to one of the sprockets 62 supporting chain 55. Sprocket 62 oscillates a sprocket 64 through vertical shaft 65. Extending around the sprocket 64 and an idler sprocket 69 is a chain 65 which is adapted to drive the feeder carriage 45. As shown best in FIG. 1, chain 65 has a rearward reach 66 and a forward reach 68. Sprocket 64 is above side wall 15 of bale case 10 and idler sprocket 69 is mounted adjacent the remote end of the track 36.

As shown in FIG. 3, spaced ends 70 and 71 of chain 65 are connected to a control member 72 which extends parallel to the direction of reciprocation of the carriage 43. The control member 72 is connected to the feeder carriage through a spring 74 which surrounds the control member. At its inner end, toward the bale chamber 10, spring 74 engages a fixed stop 75. At its opposite or outside end, spring 74 engages a piston 76 reciprocable in rectangular housing 78 fixedly connected to the carriage frame by bolts 79, as shown best in FIG. 4. As described in application Serial No. 36,561, spring 74 allows the feeder carriage to yield relative to the drive chain 65 on a feeding stroke to thereby provide a metered feed of hay into the bale chamber 10.

Since the feeder carriage 45 is driven from the plunger 20, it operates in precise timed relation relative thereto. The fingers 50 on the end of the carriage adjacent bale case 10 enter the bale case through the side opening 18 and top slots 19 between successive working strokes of the plunger. To accommodate variations in the quantity of hay to be fed into bale case 10, spring 74 is adapted to yield. If an extensive overloading condition results, the shear bolt 59 will break to separate the drive from the plunger to the feeder. When shear bolt 59 breaks, the movement of the carriage 45 toward bale case 10 ceases. On the next working stroke of the plunger, the tab 60 will engage member 61 on the reach 56 of the chain 55 to thereby move chain 55 and retract the carriage toward the remote end of the track 36. Retracting the carriage is essential, since otherwise the carriage might be left with the fingers 50 projecting into the bale case and the plunger on a working stroke would engage the fingers and cause damage to the baler structure.

The carriage 45, on a return stroke after breaking of the shear bolt 59 is free to overrun its normal retracted position as shown in FIG. 2. The carriage travels at high speed, such as seventy working and return strokes a minute. Therefore, as the carriage moves towards retracted position, it has substantial inertia and when it overruns substantial damage to the carriage and the baler structure could occur. To prevent such damage, resilient means 80 is provided constructed according to this invention.

Resilient means 80 comprises a support bar 81 which extends transverse to track members 38 and 39. Member 81 includes an outside portion 82 as shown best in FIG. 6, having end tabs 84, FIG. 3, suitably bolted to housing 85 over the feeder. Mounted on bracket 81 are two laterally spaced, resilient, hard rubber blocks 86 and 88, which are laterally spaced relative to each other, the block 86 being adjacent the track member 38 and the block 88 being near the track member 39. The rubber blocks 86 and 88 are semi-cylindrical having rear portions 89 (FIG. 6) adapted to be pressed through suitable openings in the bracket member 81 to mount the blocks thereon. Blocks 86 and 88 are mounted in a horizontal plane adapted to engage frame member 90 (FIG. 4) on carriage framework 46.

Normally, when the carriage reaches a retracted position, as shown in FIG. 2, the frame member 90 is spaced from and does not engage rubber blocks 86 and 88. However, after shear bolt 59 has been broken, on the next return stroke of the carriage, it overruns and engages these blocks, as shown in FIGS. 3 and 4, causing the blocks to be compressed. The blocks are of the same size and so located that they simultaneously engage the frame member 90. As they are compressed, they absorb the kinetic energy of the carriage and stop its outward movement. The location of the stops adjacent the respective track members causes the shock loads produced to be transmitted throughout the carriage structure and the baler framework which carries the feeder tracks. The distribution of these loads protects all the parts from being damaged. Further, the hysteresis of the rubber blocks is such that the spring-back of the carriage is less than the force applied to the blocks on engagement of the carriage with them.

While this invention has been described in connection with a particular embodiment thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a hay baler, the combination of a bale case having an infeed opening in a side wall thereof, a plunger reciprocable in said bale case, a hay receiving platform extending laterally from said side wall and communicating with said opening, a track mounted above said platform and extending transverse to the direction of reciprocation of said plunger, said track having an end adjacent said bale case opening and an end remote therefrom, a feeder carriage mounted on said track and reciprocable thereover between an extended position adjacent said bale case and a retracted position adjacent said track remote end, a chain extending alongside said track, means linking said chain to said carriage, means connecting said chain to said plunger whereby when the plunger is reciprocated the chain is oscillated and said carriage is moved toward and away from said bale chamber in timed relation to the reciprocations of said plunger, said connecting means including an element adapted to break responsive to a feeding overload condition on movement of said carriage toward said bale case to stop the feeding and including means to move the carriage toward said retracted position on the next retracting stroke after breakage of said element, said carriage being free to overrun said retracted position after breakage of said element, and rubber block means fixedly mounted adjacent said track remote end in the path of said carriage to be engaged thereby when the carriage overruns, said rubber block means being spaced from the carriage when the carriage is in said retracted position and the hysteresis of the rubber block means being such that when the carriage overruns and engages the rubber block means, energy is absorbed and spring-back of the carriage is reduced.

2. In a hay baler, the combination of a bale case having an infeed opening in a side wall thereof, a plunger reciprocable in said bale case, a hay receiving platform extending laterally from said side wall and communicating with said opening, a frame, a track mounted on said frame above said platform and extending transverse to the direction of reciprocation of said plunger, said track having an end adjacent said bale case opening, an end remote therefrom, and a pair of spaced track members, a feeder carriage mounted on said track and reciprocable thereover between an extended position adjacent said bale case and a retracted position adjacent said track remote end, a chain extending alongside said track, means linking said chain to said carriage, means connecting said chain to said plunger whereby when the plunger is reciprocated the chain is oscillated and said carriage is moved toward and away from said bale chamber in timed relation to the reciprocations of said plunger, said connecting means including an element adapted to break responsive to a feeding overload condition on movement of said carriage toward said bale case to stop the feeding and including means to move the carriage toward said retracted position on the next retracting stroke after breakage of said element, said carriage being free to overrun said retracted position after breakage of said element, and a pair of hard rubber blocks fixedly mounted adjacent said track remote end in the path of said carriage to be engaged thereby when the carriage overruns, one of the blocks being located adjacent one of the track members and the other block adjacent the other track member and positioned for simultaneous engagement by said carriage, said hard rubber blocks being spaced from the carriage when the carriage is in said retracted position and the hysteresis of the blocks being such that when the carriage overruns and engages the blocks, energy is absorbed and spring back of the carriage is reduced.

References Cited in the file of this patent

UNITED STATES PATENTS 1,881,401 Fehr _____ Oct. 4, 1932

FOREIGN PATENTS 851,025 Great Britain _____ Oct. 12, 1960